(12) United States Patent
Speckert

(10) Patent No.: US 6,309,762 B1
(45) Date of Patent: Oct. 30, 2001

(54) REPLACEABLE WEAR RESISTANT SURFACES

(75) Inventor: Michael A. Speckert, Charleston, IN (US)

(73) Assignee: Conforma Clad, New Albany, IN (US)

( * ) Notice: Subject to any disclaimer, the term of this patent is extended or adjusted under 35 U.S.C. 154(b) by 0 days.

(21) Appl. No.: 09/437,008

(22) Filed: Nov. 9, 1999

Related U.S. Application Data

(63) Continuation-in-part of application No. 09/057,265, filed on Apr. 8, 1998, now abandoned.
(60) Provisional application No. 60/045,996, filed on May 8, 1997.

(51) Int. Cl.$^7$ ..................................................... B32B 15/18
(52) U.S. Cl. .................... 428/683; 408/144; 428/627; 428/638; 428/644; 428/648; 428/676; 428/677; 428/678; 428/679; 428/908.8; 428/926; 492/54
(58) Field of Search .................. 428/683, 627, 428/678, 679, 676, 677, 644, 648, 638, 908.8, 926, 34.1; 384/912; 408/144; 492/54

(56) References Cited

U.S. PATENT DOCUMENTS

| 4,430,389 | 2/1984 | Otani . |
| 4,474,861 | 10/1984 | Ecer . |
| 4,495,907 | 1/1985 | Kamo . |
| 4,933,240 | * 6/1990 | Barber, Jr. ............................ 428/627 |
| 5,011,514 | 4/1991 | Cho et al. . |

OTHER PUBLICATIONS

Xaloy brochure, Printed Before Filing Date; Xaloy, Pulaski, Va., USA; 5 pages; (no date given).

Iron & Steel Society, "Rolls for the Metalworking Industries", Chapter 9—Manufacture of Roll Sleeves, Dec. 1990, Iron and Steel Society, Inc., Warrendale, PA 15086 US.

Conforma Clad "Oilfield Products" Brochure, (no date given).

Eyre et al., "Wear Chacteristics of Piston Rings and Cylinder Liners" American Society of Lubrication Engineers Conference, Oct. 5–7, 1981. New Orleans, Louisiana.

Oberg and Jones, "Machinery's Handbook", Nineteenth Edition, Dec. 1971, pp 1510–1515; Industrial Press, Inc . New York, New York.

* cited by examiner

Primary Examiner—Robert R. Koehler
(74) Attorney, Agent, or Firm—Theresa Fritz Camoriano; Camoriano and Associates

(57) ABSTRACT

An article of manufacture having a wear-resistant cylindrical surface is made up of a metallurgically tough base steel with a substantially cylindrical surface, a thin, cylindrical metal sleeve mated to and affixed to the cylindrical surface of the base steel, and a composite metallic coating containing particles having a hardness greater than Rockwell C 70 metallurgically bonded to the surface of the sleeve opposite the base steel/sleeve interface.

19 Claims, 2 Drawing Sheets

REPLACEABLE WEAR RESISTANT SURFACES

This application claims priority under 35 USC 119(e) from Provisional Patent Application Ser. No. 60/045,996, filed May 8, 1997 and is a continuation-in-part of Ser. No. 09/057,265, filed Apr. 8, 1998, now abandoned.

BACKGROUND OF THE INVENTION

The present invention relates to means for protecting bearings, shafts, rolls, and other cylindrical surfaces against wear and/or corrosion. Numerous means are known for protecting cylindrical surfaces. One common method is to construct the cylindrical component from wear/corrosion resistant materials. Another common method is to apply protection to specified areas of the component via welding, spraying, spraying/fusing, brazing, heat treating, etc. Usually, cost prohibits the widespread use of the first option. The second option involves problems with dimensional distortion, as application of the protective layer involves exposure of the component to elevated temperatures, and the component and protective layer have differences in thermal expansion. If the coating process does not include some form of fusing/bonding operation, the resulting product suffers from poor bond strength and is prone to spalling during service.

Another method of wear/corrosion protection is the attachment of protective cladding onto a component via interference fitting, adhesives, fasteners, etc. However, in the case of wear, most materials which provide adequate protection, such as sintered carbides and ceramics, are hard (over 40 Rc) and brittle. Due to the lack of mechanical strength, their ability to transfer mechanical stresses to the coupling component without defect initiation and catastrophic failure is very limited. Also, the ability to put these brittle clads onto outside diameters, which creates tensile stresses by interference fitting, is limited.

In the exploration for oil and other mining operations, mud motors are used extensively. The mud motor consists of three sections: the power section, the bearing assembly, and the bit box. Within the bearing assembly, there are several radial bearing sets and multiple thrust bearing sets on a drive shaft. Typical motors have two pairs of radial bearings consisting of the upper rotating and stationary and lower rotating and stationary pair. Due to the harsh conditions to which these bearings are subjected, they require frequent replacement and are a major portion of the motor's operating cost.

During the drilling operation, the bearings are lubricated with a specialized drilling mud. Rock cuttings from the operation frequently contaminate the system, thus destroying the lubrication properties of the mud. As a result, the bearings suffer wear through abrasion and erosion. Additionally, bearing-to-bearing contact due to restricted mud flow and normal service requirements create severe galling wear. In addition to wear, high mechanical stresses in the form of cyclical loading, tensile overload and high impact cause fatigue cracks and, eventually, catastrophic failure. Well bores also tend to be hot (in excess of 400° F.). Under these conditions, the lubricating mud may become corrosive due to reservoir chemical contamination. All of these factors combine so that a successful bearing must be wear resistant with poor lubrication, mechanically tough, impact resistant, corrosion resistant, and able to operate at elevated temperature.

A number of different types of materials in the form of bearings and bearing sleeves have been used to increase bearing life in this difficult application. These include marine bearings (metal shaft with a rubber stationary member), ceramic sleeve bearings, tungsten carbide sleeve bearings and metallic sleeve bearings. For the most part, these various techniques have been unsuccessful due to reasons previously mentioned. The materials that are wear resistant (i.e. ceramics and tungsten carbides) are too brittle to handle the impact requirements. Alternatively, the tougher materials such as steel and rubber do not have sufficient wear resistance. The inherent brittleness of carbides and ceramics makes them subject to chipping. Dislodging and fracturing of the pieces can damage the remainder of the bearing and other components within the motor.

Direct applied wear protection techniques such thermal sprays and brazing of individual carbide inserts have also been used with limited success. These techniques are prone to spalling and delamination due to inferior bond strengths. Spray techniques are also difficult to apply on the internal surfaces of the stationary members.

One process which has been relatively successful in the wear protection of the radial bearing is the Conforma Clad process. This process, as covered in U.S. Pat. No. 3,743,556, which is hereby incorporated by reference, utilizes powder cloth technology to produce a coating that is tough, wear resistant, and metallurgically bonded to the bearing substrate. The main drawback to the Conforma Clad process is that it is expensive, and the coating is applied at high temperatures which leads to distortion due to differences in coefficients of expansion between the coating and substrate.

Another limitation is cracking of the coating during heat treatment to increase the toughness of the supporting base steel. For example, bearings for oil-drilling mud motors and rolls for forming metals require the combination of resistance to wear and metallurgical toughness to withstand impact stresses. Typically, wear-resistant metals and metaloids have a Rockwell C hardness of over 60, whereas tough steels have Rockwell C hardness of below 50 and often below 40. Heat-treating steel to obtain the high hardness needed for wear resistance makes it too brittle to resist high impact loads.

This problem has been approached by applying a wear-resistant coating over heat-treatable steel, such as the more common heat-treatable steels like the AISI 4100 series steels that develop toughness through the formation of martensite. Martensite expands during heat treatment. Thus, heat treating a martensitic steel that has been coated with a wear-resistant coating generates cracks in the coating. This has been a disadvantage of the carbide composite coatings applied to mud-motor bearings. Even with cracks, coatings still provide adequate protection, but performance would be improved without the cracks.

Replaceable inside-diameter sleeves with composite carbide coatings are used in extruder barrels. However, they are not subject to high impact stresses as some bearings, shafts, and rolls are. So the need to configure the mechanical properties of the sleeve to those of the steel base material to maximize impact resistance is not as great.

SUMMARY OF THE INVENTION

The objective of this invention is to produce bearings, rolls, pistons, and shafts that possess the combination of high resistance to wear, high strength, high toughness, and high resistance to fatigue cracking.

This is accomplished by providing a base material having a Charpy impact strength of over 30 foot pounds and a tensile strength of over 120,000 pounds per square inch, providing a sleeve having a Rockwell C hardness of less than 40 over 50% of its thickness and less than 15% Martensite, and metallurgically bonding a coating to the sleeve. The coating contains particles having a Rockwell C hardness of greater than 70. The sleeve and base would generally be expected to have different metallurgical structures in order to have such different characteristics.

DESCRIPTION OF THE PREFERRED EMBODIMENTS

Figure 3A:
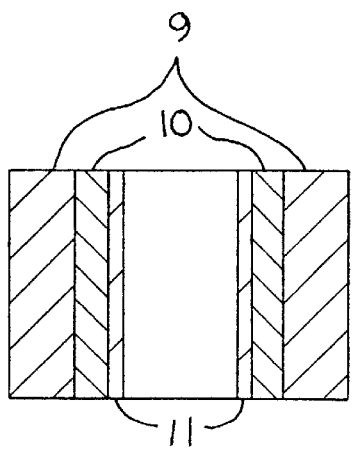
FIG. 3a is a schematic view of a cylindrical member with a wear-resistant sleeve on the inside, made in accordance with the present invention.
Figure 3B:
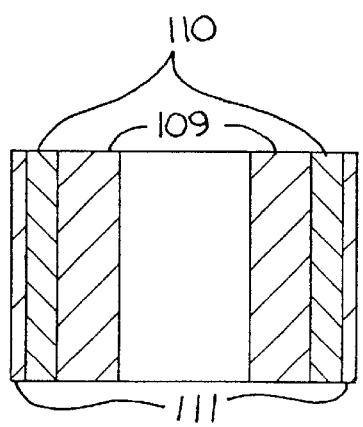
FIG. 3b is a schematic view of a cylindrical member with a wear-resistant sleeve on the outside, made in accordance with the present invention.

FIGS. 3a and 3b show preferred embodiments of the present invention. FIG. 3a depicts wear protection on the inside surface of a cylindrical part, and FIG. 3b depicts wear protection on the outside surface of a cylindrical part. FIG. 3a shows a tough steel cylindrical base 9 attached to a replaceable cylindrical inner sleeve 10. FIG. 3b shows a tough steel cylindrical base 109 attached to a replaceable cylindrical outer sleeve 110. In FIG. 3a, the steel inner sleeve 10 is coated with a carbide-containing composite material 11 on its internal surface, which is the surface subject to wear. In FIG. 3b, the steel outer sleeve 110 is coated with a carbide-containing composite material 111 on its external surface, which is the surface subject to wear. In each case, the steel of the cylindrical base 9, 109 has a different metallurgical structure from that of the replaceable sleeve 10, 110.

In these preferred embodiments, the steel base 9, 109 has a Charpy impact of over about 30 foot-pounds and a tensile strength of over about 120,000 pounds per square inch. Low alloy steels such as AISI 4140 and other steels in this family are preferred because of their relatively low costs and good mechanical properties, although other alloys that possess this combination of Charpy impact and tensile strength are acceptable. They would include all of the hardenable low carbon, high carbon, and stainless steels.

The toughness of 4100 series steels is achieved through the formation of Martensite, which is a complex iron/carbon crystallographic structure. The combination of impact strength and tensile strength specified above is achieved through the conversion of carbon into Martensite. The tough base steel material preferably has more than about 40% Martensite.

The primary requirements of the sleeve 10, 110 are that it not undergo phase transitions like Martensite or any other metallurgical phase that causes the sleeve to expand enough to cause the coating applied to it to crack and that it be ductile enough to resist cracking at high stress. These requirements can be met with steels that: (a) have a Rockwell C hardness of less than 40 over 50% of their thickness and that (b) have less than about 15% Martensite after the coating is applied to the sleeve. When the coating is applied, the metallurgical structure of the portion of the sleeve adjacent to the coating may change, so that the material becomes hardened adjacent to the coating. When we say that the sleeve must have a Rockwell C hardness of less than 40 over 50% of its thickness, we recognize that there may be some hardening adjacent to the coating, but the hardness must remain less than 40 (and preferably less than 30) for more than half of the thickness (and preferably for more than 70% of the thickness) of the sleeve after the coating has been applied. The materials suitable for the sleeve are usually low carbon steels, such as AISI 1018, which does not form Martensite.

The thickness of the sleeve 10, 110 preferably is less than 0.5 inches and most preferably less than 0.375 inches. For some applications, such as small bearings for mud motors, the thickness of the sleeves can be as low as 0.01 inches.

Metallurgical bonding of the below-described coating 11, 111 to the sleeve 10, 110 necessarily requires some interdiffusion of elements at the interface between the coating and the sleeve. Often, diffusion of smaller elements like boron in the coating diffuse relatively deeply into the steel sleeve, thus embrittling it. The thickness of the zone of embrittlement in the sleeve is held to less than 10% of the thickness of the sleeve, preferably less than 5%.

The coating 11, 111 is a composite of particulate hard particles and a braze alloy to bond them to the substrate. Hard particles could be carbides, nitrides, suicides, aluminides, or borides. The hard particles preferably have a hardness of greater than Rockwell C 70. The preferred hard particles are tungsten carbide and chromium carbide between 0.1 and 100 microns, although particles outside of this range are operable. The carbide particles can be cobalt or nickel sintered carbide or crystalline carbides. The crystalline carbide can be incorporated into the structure by powder metallurgy or by precipitation. Other hard particles can be borides, silicides, aluminides and other intermetallic compounds. The volume percent of carbides in the composite can vary from about 15% to about 75%. Over 40 volume % is preferred. The coating can be applied by any of the processes for making hardfacing: thermal spraying coupled with fusion to establish metallurgical bonding to the substrate, cloth technology disclosed in U.S. Pat. No. 3,743,556, or painting or dipping followed by furnace fusion.

The preferred braze alloys are those based upon iron, nickel or cobalt in combination with over 4% chromium. Other alloys may be included to improve wear resistance, strength, and reduce melting point. The lesser alloys encompass carbon, boron, silicon, iron, molybdenum, tungsten, and manganese.

The coating is metallurgically bonded to the steel sleeve through interdiffusion of the coating and the sleeve. Over 50% of the coating should be bonded as measured linearly in metallographic examination. Preferably over 90% of the coating is metallurgically bonded to the substrate.

The thickness of the composite coatings 11, 111 can range from about 0.0015 inch to about 0.20 inch depending upon the application. The thickness of coating on bearings for mud motors preferably is 0.020 to 0.030 inch thick. Other applications such as rolls for guiding steel require thicker coatings.

The sleeve, coated on the inside or outside diameter, depending upon whether it is to protect inside diameter or outside diameter surfaces, is attached to the base metal by any method, such as interference fitting, brazing, tack welding at the edges, soldering, mechanical keys, pins, and/or splines, or adhesives. Interference fit is preferred in those applications requiring replaceable sleeves.

It has been found that, during normal operation of the mud motor, circumferential forces on the radial bearing can exceed 20 pounds per square inch, and, during extreme cases, can exceed 800 pounds per square inch. Testing and calculations of torsional bond strengths for this invention have shown that the interference fitted sleeve can exceed 2000 pounds per square inch bond strengths. As a testimony to the invention's strength and durability, side-load forces can cause 100% collapse without catastrophic failure of the sleeve or spalling of the coating.

Figure 1:
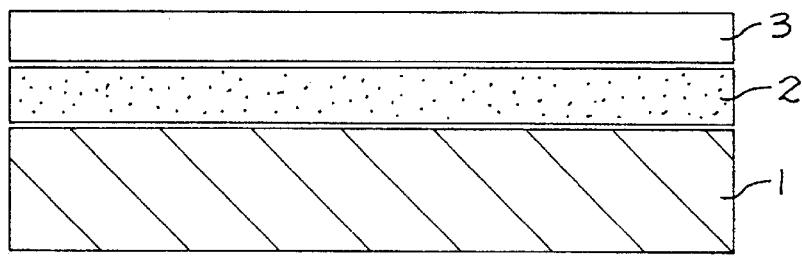
FIG. 1 briefly illustrates the prior art cloth coating technique.

Referring to FIG. 1, which briefly illustrates the basic concept described in U.S. Pat. No. 3,743,556, the coating is achieved by first laying a flexible hard particle cloth (2) onto a prepared substrate surface (1). A second layer of flexible braze cloth (3) or preform is applied over the hard particle cloth 2. An adhesive can be used for the joining of the cloths to each other and to the substrate. Brazing is accomplished in a controlled atmosphere such as vacuum or hydrogen. At a temperature determined by the braze alloy composition, the braze material becomes molten and infiltrates the hard particle layer below.

Figure 2:
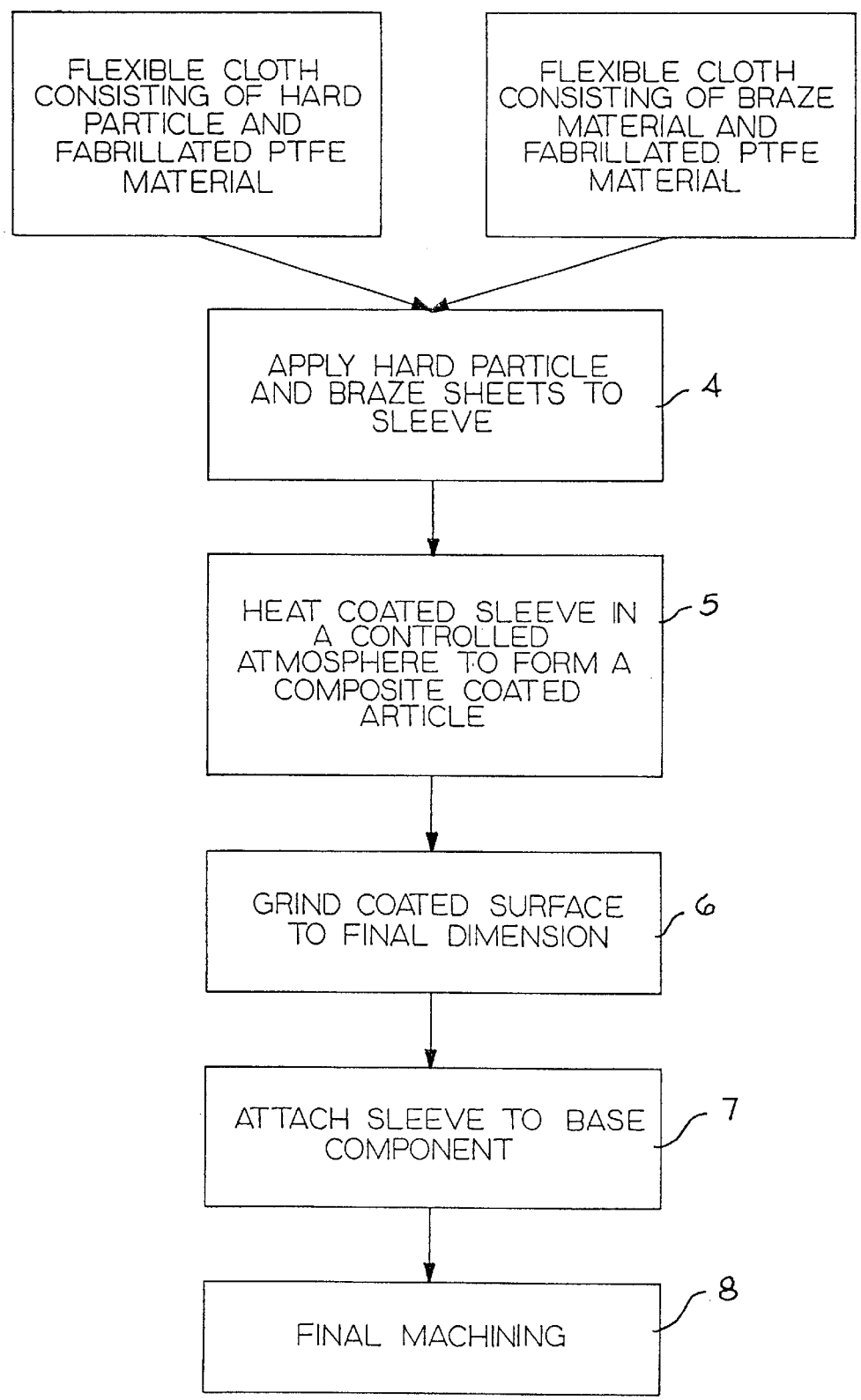
FIG. 2 is a flow diagram illustrating a wear/corrosion sleeve fabrication process in accordance with the present invention.

While the coating applied to sleeves can be applied by any hardfacing method, the procedure that has been used to make parts to evaluate this invention is depicted in FIG. 2. As referenced in FIG. 1, a layer of flexible hard particle cloth and braze alloy cloth (or preform) is glued to the inner or outer diameter surfaces of the sleeve substrate depending upon whether the sleeve is attached to an inside or an outside diameter. An adhesive which has suitable strength and chemistry requirements can be used for this bonding procedure. The coated sleeve is placed into a furnace which has a controlled atmosphere such as vacuum or hydrogen. At a temperature determined by the braze alloy composition, the braze cloth layer becomes molten and infiltrates the hard particle cloth below. After solidification and cooling, the sleeve can be processed by grinding of the coating or machining of the substrate backing to specified dimensions. While grinding or machining to final dimensions is optional, it is usually required when the sleeve is attached to the base component by interference fit. The sleeve is then attached to the base component. Though attachment can be various methods as described above, interference fitting is preferred for use where the base component is subjected to high stress and temperatures. In order to attach the sleeve to the base substrate, the outer element of the sleeve/base-components assembly is heated and the inner element is cooled. When the sleeve is attached to an outside diameter of the base component, as in FIG. 3b, the sleeve 110 is heated and the base component 109 is cooled. When the sleeve is attached to the inside diameter of a base component, as shown in FIG. 3a, the base component 9 is heated and the sleeve 10 is cooled. Cooling can be by "dry ice", liquid nitrogen, or by refrigeration. Heating typically is done in an oven of some type. Once the outer element has been heated and the inner element has been cooled, they are assembled and allowed to come to ambient temperature. Further processing such as machining and grinding is performed if required.

During the engineering of this invention, it was necessary to estimate the required bond strengths needed in the interference fit sleeve-bearing system. During normal operation of the mud motor, torque ranging from 6,000 to 20,000 ft-lbs can be produced. Bearing-to-bearing contact forces can also exceed 10,000 lbs. Assuming a coefficient of friction of 0.2 between coupled galling Conforma Clad coatings, circumferential forces on the radial bearing were estimated to be in excess of 20 pounds per square inch. Under the rarest of conditions, where total bearing lock-up occurs, transmitting all of the motor's torque to the bearing, circumferential forces as high as 800 pounds per square inch can be transmitted to the bearing surface. Testing and calculations of torsional bond strengths for this invention, as described in Example 2, have shown that the interference fitted sleeve can exceed 2,000 pounds per square inch bond strengths at temperatures exceeding 500° F.

To facilitate replacement of sleeves from the base component, the mating surfaces on both the sleeve and base component may be made tapered to form slight conical shapes. The slope angle of the taper is less than about 10 degrees, but less than 5 degrees is preferred. The slope angle is defined in the *Handbook of Dimensional Measurements* by Francis T. Farago and Mark A. Curtis, which is hereby incorporated by reference. To remove an inside diameter sleeve, pressure would be applied to the end of the sleeve with the smaller diameter. To remove an outside diameter sleeve, pressure would be applied to the end of the sleeve with the larger diameter.

Additionally, to inhibit galling between the sleeve and the mating surface of the base component during removal of the sleeve from the base component, a thin layer of copper, tin, or other soft metal having a Rockwell B hardness less than 50 would be plated on either or both of the mating surfaces prior to joining the sleeve to the base component. The resulting soft metal layer preferably has a thickness less than 0.01 inches.

EXAMPLES

1—Fabrication of Composite Sleeves

Twelve pieces of 4-inch outer diameter drawn-over-mandrel 1018 type steel and twelve pieces of 2-inch outer diameter drawn-over-mandrel 1018 type steel were cut into 4-inch long sections. To make the cloth in the coating process, tungsten carbide powder (40% by volume 2–5 micron size and 60% by volume −325 mesh size) was mixed with 6% by volume PTFE. The mixture was mechanically worked to fibrillate the PTFE and entrap the tungsten carbide particles. The mixture was then rolled into a sheet with a final thickness of 0.055 inches.

The braze metal cloth was comprised of 81.5% nickel, 15% chromium and 3.5% boron by volume powder. The powder was mixed with 6% by volume PTFE and rolled to form a cloth using the same procedures as stated above. Six each of the 4-inch sleeves and 2-inch sleeves were coated on the inner diameter by first applying the tungsten carbide cloth onto the sleeve surface and then the braze cloth over the tungsten carbide cloth. Acrysol 60, a water-based adhesive made by Rohm and Haas, was used during the application. The same procedures were performed to coat the outer diameter of six each 4-inch and 2-inch diameter sleeves. The sleeves were placed in a vacuum furnace and heated to 2140° F. for approximately 30 minutes. The sleeves were then cooled to room temperature.

To assemble the composite sleeve-bearing system, dimensions were taken on the inner diameter of the outer-diameter-coated-sleeves. Likewise, the outer diameters were measured for the inner-diameter-coated-sleeves. Based on the average diameter of the sleeves, bearing components were machined from 4140 type steel with a 0.5-inch wall thickness and allowing approximately a 0.004-inch interference fit for the 4-inch inside diameter and outside diameter sleeves and a 0.003-inch interference fit for the 2-inch inside diameter and outside diameter sleeves. To shrink-fit the sleeves into or over the bearing components, a combination of "dry-ice" and heat was used. The outer component of the bearing-sleeve combination was heated from 700° F.–1000° F. to create expansion. The inner component was cooled in the ice for contraction. Earlier tests showed that the coated sleeve will contract approximately 0.00125 inches per inch of diameter while the steel bearing contracts approximately 0.0015 inches per inch of diameter. Each component was allowed to heat or cool for approximately 45–60 minutes.

2—Determining the Bond Strength of an Interference Fit

Figure 4:
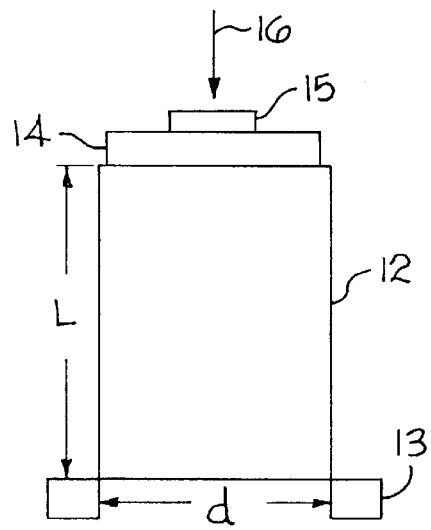
FIG. 4 is a schematic view of an apparatus used to determine the torsional bond strength between the sleeve and the bearing component.

The completed composite sleeve-bearing component systems, as described in Example 1, were evaluated for sleeve-to-bearing bond strength. To simulate actual operating conditions, the sleeve-bearing assemblies were soaked in an open-air furnace (set at 700° F.) until the parts reached 500° F. Temperatures were determined using thermocouples attached to the parts. The torsional bond strength between the sleeve and the bearing component was determined using the set-up as shown in FIG. 4 below. The outer element (12) of the sleeve-bearing assembly (that being the sleeve for an outer diameter coated sleeve or the bearing for the inner diameter coated sleeve) rested on a ring support (13). A plunger (14) was positioned on top of the sleeve-bearing such that it rested only on the inner element of the assembly. A load cell (15) with a 100,000 pound capacity was placed on top of the plunger as shown. Force (16) was applied to the plunger with a hydraulic press. The force applied to the plunger was selectively transmitted to the inner element. Force was increased until the inner element was extruded from within the outer element of the bearing/sleeve assembly. The force to extrude was used in the following equation for axial strength:

Axial strength=2 Lbpf (measured)

L = length of overlap (measured)
b = interference radius fit (based on diameters of sleeve/bearing assembly)
f = coefficient of friction (estimated to be 0.4 for steels)
p = shrink fit pressure (unknown)
The torsional strength = 2 Lb 2 pf
The following variables in a sleeve-bearing assembly were experimentally determined using the apparatus shown in FIG. 4.

| Condition # | Description |
|---|---|
| 1 | * 2-inch diameter sleeve coated on the inner diameter/fitted into the bearing inner diameter. |
| 2 | * 2-inch diameter sleeve coated on the outer diameter/fitted onto the bearing outer diameter. |
| 3 | * 4-inch diameter sleeve coated on the inner diameter/fitted into the bearing inner diameter. |
| 4 | * 4-inch diameter sleeve coated on the outer diameter/fitted onto the bearing outer diameter. |

To convert the axial strengths into torsional strengths, the equations shown above were used. In the axial strength equation, the unknown value of "p" (shrink-fit pressure) was determined. This value was then inserted into the torsional strength equation (with an assumption of 0.5 for the torsional coefficient of friction, "f").

The average values for each configuration are shown in the table below:

| Condition # | Axial Strength (lbs) | Torsional Strength (psi) |
|---|---|---|
| 1 | 30437 | 3027 |
| 2 | 42240 | 4201 |
| 3 | 21428 | 2131 |
| 4 | 24132 | 2400 |

It will be obvious that modifications may be made to the embodiments described above without departing from the scope of the present invention.

What is claimed is:

1. An article of manufacture having a wear-resistant cylindrical surface, said article of manufacture comprising:
    a base component with a substantially cylindrical surface, said base component being made of steel having a Charpy impact strength of over 30 foot pounds and a tensile strength of over 120,000 pounds per square inch;
    a cylindrical metal sleeve, defining inner and outer surfaces, mated to and affixed to the substantially cylindrical surface of the base component at one of its inner and outer surfaces, said sleeve being made of steel and having a Rockwell C hardness of less than 40 over at least 50% of its thickness and having less than 15% Martensite; and
    a composite metallic coating containing particles having a hardness of greater than Rockwell C 70 metallurgically bonded to the other of the inner and outer surfaces of the sleeve.

2. An article of manufacture as recited in claim 1, wherein the steel of the base component has a different metallurgical structure from the steel of the sleeve.

3. An article of manufacture having a wear-resistant cylindrical surface as recited in claim 1, wherein the article of manufacture is a bearing.

4. An article of manufacture having a wear-resistant cylindrical surface as recited in claim 1, wherein the inner surface of the sleeve has the composite metallic coating, and the outer surface of the sleeve lies adjacent to the base component.

5. An article of manufacture having a wear-resistant cylindrical surface as recited in claim 1, wherein the outer surface of the sleeve has the composite metallic coating and the inner surface of the sleeve lies adjacent to the base component.

6. An article of manufacture having a wear-resistant cylindrical surface as recited in claim 5, wherein the article of manufacture is a shaft.

7. An article of manufacture as recited in claim 5, wherein the article is a forming roll.

8. An article of manufacture as recited in claim 4, wherein the article is a bearing.

9. An article of manufacture having a wear-resistant cylindrical surface as recited in claim 1, wherein the sleeve is affixed to the base component by an interference fit.

10. An article of manufacture having a wear-resistant cylindrical surface as recited in claim 1, wherein the sleeve is affixed to the base component by welding, brazing or soldering.

11. An article of manufacture having a wear-resistant cylindrical surface as recited in claim 1, wherein the composite metal coating comprises particles of tungsten carbide bonded into a matrix of a hard-facing alloy.

12. An article of manufacture as recited in claim 1, wherein the substantially cylindrical surface of the base component is tapered with a slope angle of less than ten degrees, and the corresponding mating surface of the sleeve has substantially the same slope.

13. An article of manufacture as recited in claim 1, and further comprising a layer of soft metal, less than 0.01 inches thick and having a Rockwell B hardness of less than 50, lying between the base component and the sleeve.

14. An article of manufacture as recited in claim 12, and further comprising a layer of soft metal, less than 0.01 inches thick and having a Rockwell B hardness of less than 50, lying between the base component and the sleeve.

15. An article of manufacture as recited in claim 1, wherein said sleeve is less than 0.375 inches thick.

16. An article of manufacture as recited in claim 12, wherein said sleeve is less than 0.375 inches thick.

17. An article of manufacture having a cylindrical outer wear surface, comprising:
   a base component having a substantially cylindrical outer surface, said base component being made of steel having more than about 40% Martensite;
   a substantially cylindrcal sleeve mounted on the outer surface of said base by an interference fit, said sleeve being made of a steel having less than about 15% Martensite and having a Rockwell C hardness of less than 40 for greater than 50% of its thickness; and
   a composite metallic coating at least 50% metallurgically bonded to the outer surface of said cylindrical sleeve, said coating containing particles having a hardness of greater than Rockwell C 70.

18. An article of manufacture having a cylindrical inner wear surface, comprising:
   a base component having a substantially cylindrical inner surface, said base component being made of steel having more than about 40% Martensite;
   a substantially cylindrical sleeve mounted on the inner surface of said base by an interference fit, said sleeve being made of a steel having less than about 15% Martensite and having a Rockwell C hardness of less than 40 for greater than 50% of its thickness; and
   a composite metallic coating at least 50% metallurgically bonded to the inner surface of said cylindrical sleeve, said coating containing particles having a hardness of greater than Rockwell C 70.

19. An article of manufacture having a wear-resistant cylindrical surface, said article of manufacture comprising:
   a base component made of a hardenable low alloy steel with a tensile strength of over 120,000 pounds per square inch;
   a cylindrical metal sleeve, defining inner and outer surfaces, mated to and affixed to the substantially cylindrical surface of the base component at one of its inner and outer surfaces, said sleeve being made of steel having a Rockwell C hardness of less than 40 over at least 50% of its thickness; and
   a composite metallic coating containing particles having a hardness of greater than Rockwell C 70 metallurgically bonded to the other of the inner and outer surfaces of the sleeve.

* * * * *

UNITED STATES PATENT AND TRADEMARK OFFICE
CERTIFICATE OF CORRECTION

PATENT NO. : 6,309,762 B1  Page 1 of 1
DATED : October 30, 2001
INVENTOR(S) : Michael A. Speckert It is certified that error appears in the above-identified patent and that said Letters Patent is hereby corrected as shown below:

<u>Column 4,</u>
Line 29, delete "suicides" and insert therefor -- silicides --.

Signed and Sealed this

Twelfth Day of March, 2002

Attest:

Attesting Officer

JAMES E. ROGAN
*Director of the United States Patent and Trademark Office*